US007952588B2

(12) United States Patent
Jiao et al.

(10) Patent No.: US 7,952,588 B2
(45) Date of Patent: May 31, 2011

(54) GRAPHICS PROCESSING UNIT WITH EXTENDED VERTEX CACHE

(75) Inventors: Guofang Jiao, San Diego, CA (US); Brian Evan Ruttenberg, Goleta, CA (US); Chun Yu, San Diego, CA (US); Yun Du, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 919 days.

(21) Appl. No.: 11/499,187

(22) Filed: Aug. 3, 2006

(65) Prior Publication Data

US 2008/0030513 A1 Feb. 7, 2008

(51) Int. Cl.
*G06T 1/20* (2006.01)
*G06T 1/00* (2006.01)
*G09G 5/36* (2006.01)

(52) U.S. Cl. .................. 345/557; 345/506; 345/522

(58) Field of Classification Search .............. 345/421, 345/557, 522, 506, 537, 423
See application file for complete search history.

(56) References Cited

U.S. PATENT DOCUMENTS

| | | | |
|---|---|---|---|
| 4,951,232 A | 8/1990 | Hannah | |
| 5,886,711 A | 3/1999 | Rossin et al. | |
| 5,914,726 A | 6/1999 | Schultz | |
| 6,549,209 B1 | 4/2003 | Shinohara et al. | |
| 6,577,305 B1 | 6/2003 | Duluk, Jr. et al. | |
| 6,642,928 B1 | 11/2003 | Deming et al. | |
| 6,690,380 B1 * | 2/2004 | Hussain et al. | 345/557 |
| 6,717,577 B1 * | 4/2004 | Cheng et al. | 345/419 |
| 6,774,896 B2 | 8/2004 | Oka | |
| 6,972,769 B1 * | 12/2005 | Nebeker et al. | 345/552 |
| 7,038,692 B1 | 5/2006 | Priem et al. | |
| 7,098,924 B2 | 8/2006 | Prokopenko et al. | |
| 7,233,334 B1 * | 6/2007 | Acocella et al. | 345/519 |
| 7,505,036 B1 * | 3/2009 | Baldwin | 345/421 |
| 7,710,427 B1 | 5/2010 | Hutchins et al. | |
| 2001/0045955 A1 * | 11/2001 | Oka | 345/582 |
| 2004/0201592 A1 | 10/2004 | Huang | |
| 2006/0050072 A1 | 3/2006 | Goel | |
| 2007/0040844 A1 | 2/2007 | Junkins | |
| 2009/0006773 A1 | 1/2009 | Yamaguchi et al. | |

FOREIGN PATENT DOCUMENTS

| | | |
|---|---|---|
| EP | 1096427 A2 | 5/2001 |
| WO | WO2005088454 | 9/2005 |

OTHER PUBLICATIONS

International Preliminary Report on Patentability, PCT/US07/074882, International Preliminary Examining Authority, European Patent Office, Nov. 28, 2008.

(Continued)

*Primary Examiner* — Hau H Nguyen

(57) ABSTRACT

Techniques are described for processing computerized images with a graphics processing unit (GPU) using an extended vertex cache. The techniques include creating an extended vertex cache coupled to a GPU pipeline to reduce an amount of data passing through the GPU pipeline. The GPU pipeline receives an image geometry for an image, and stores attributes for vertices within the image geometry in the extended vertex cache. The GPU pipeline only passes vertex coordinates that identify the vertices and vertex cache index values that indicate storage locations of the attributes for each of the vertices in the extended vertex cache to other processing stages along the GPU pipeline. The techniques described herein defer the setup of attribute gradients to just before attribute interpolation in the GPU pipeline. The vertex attributes may be retrieved from the extended vertex cache for attribute gradient setup just before attribute interpolation in the GPU pipeline.

54 Claims, 9 Drawing Sheets

OTHER PUBLICATIONS

International Search Report, PCT/US07/074882, International Search Authority, European Patent Office, May 16, 2008.
Deering, Michael F. and Nelson, Scott R.: Leo.: a system for cost effective 3D shaded graphics SIGGRAPH '93: Roceedings of the 20th Annual Conference on Computer Graphics and Interactive Techniques, 1993, pp. 101-108, XP002516786.
Written Opinion PCT/US/074882, International Search Authority, European Patent Office, May 16, 2008.

* cited by examiner

GRAPHICS PROCESSING UNIT WITH EXTENDED VERTEX CACHE

TECHNICAL FIELD

This disclosure relates to graphics processing units and, more particularly, processing images with graphics processing units.

BACKGROUND

A graphics processing unit (GPU) is a dedicated graphics rendering device utilized to manipulate and display computerized graphics on a display device. GPUs are built with a highly-parallel structure that provides more efficient processing than typical, general-purpose central processing units (CPUs) for a range of complex algorithms. For example, the complex algorithms may correspond to representations of three-dimensional computerized graphics. A GPU may implement a number of primitive graphics operations, such as forming points, lines, and triangles, to create complex, three-dimensional images on a display device more quickly than drawing the images directly to the display device with a CPU.

Vertex shading and fragment (pixel) shading are often utilized in the video gaming industry to determine final surface properties of a computerized image, such as light absorption and diffusion, texture mapping, light relation and refraction, shadowing, surface displacement, and post-processing effects. GPUs include at least three major pipeline stages in a typical shader based graphics core: a vertex shader stage, a primitive setup and interpolation stage, and a fragment shader stage.

A vertex shader is applied to an image geometry for an image and generates vertex coordinates and attributes of vertices within the image geometry. Vertex attributes include, for example, color, normal, and texture coordinates associated with a vertex. A primitive setup and rejection module will form primitives, such as points, lines, or triangles, and reject invisible primitives based on the vertices within the image geometry. An attribute setup module computes gradients of attributes within the primitives for the image geometry. Once the attribute gradient values are computed, primitives for the image geometry may be converted into pixels, and hidden primitive and pixel rejection may be performed. An attribute interpolator then interpolates the attributes over pixels within the primitives for the image geometry based on the attribute gradient values, and sends the interpolated attribute values to the fragment shader for pixel rendering. Results of the fragment shader will be output to a post-processing block and a frame buffer for presentation of the processed image on the display device.

Attributes of vertices within the image geometry are passed through each processing stage along the GPU pipeline. Therefore, the GPU pipeline must move a large amount of data and requires a wide internal data bus to meet the data throughput. Moving the large amount of data through each of the processing stages in the GPU pipeline may create a bottleneck for primitives that include large numbers of attributes. Additionally, attribute gradient setup is computationally intensive and may slow down image processing within the GPU pipeline.

SUMMARY

In general, the disclosure relates to techniques for processing computerized images with a graphics processing unit (GPU) using an extended vertex cache. The techniques include creating an extended vertex cache coupled to a GPU pipeline to reduce an amount of data passing through the GPU pipeline. The GPU pipeline receives an image geometry for an image, and stores attributes for vertices within the image geometry in the extended vertex cache. The GPU pipeline only passes vertex coordinates that identify the vertices, and vertex cache index values that indicate storage locations of the attributes for each of the vertices in the extended vertex cache to other processing stages along the GPU pipeline. In some embodiments, the GPU pipeline temporarily stores the vertex coordinates in the extended vertex cache.

A GPU includes at least three major pipeline stages: a vertex shader stage, a primitive setup and interpolation stage, and a fragment shader stage. The primitive setup and interpolation stage in the GPU pipeline includes several sub-stages that each performs using either vertex coordinates or vertex attributes. For example, primitive setup and primitive rejection only utilize the vertex coordinates to form primitives and discard a subset of the primitives that are unnecessary for the image. However, attribute gradient setup and attribute interpolation utilize the vertex attributes. The techniques described herein defer the computationally intensive setup of attribute gradients to just before attribute interpolation in the GPU pipeline. The vertex attributes may be retrieved from the extended vertex cache for attribute gradient setup as one of the last steps before attribute interpolation in the GPU pipeline. Therefore, the vertex attributes are not introduced to the GPU pipeline until after primitive setup and primitive rejection.

In this way, the GPU pipeline only moves the primitives for the image geometry, the vertex coordinates that identify each of the vertices within the primitives, and vertex cache index values that indicate storage locations of the attributes within the extended vertex cache for each of the vertices within the primitives. The techniques can substantially eliminate bottlenecks in the GPU pipeline for primitives that include large numbers of attributes. In addition, the techniques may improve image processing speed within the GPU pipeline by deferring the attribute gradient setup to just before attribute interpolation in the GPU pipeline. More specifically, deferring the attribute gradient setup within the GPU pipeline until after rejection of the subset of the primitives that are unnecessary for the image may substantially reduce computations and power consumption as the attribute gradient setup will only be performed on a subset of the primitives that are necessary for the image.

In one embodiment, the disclosure provides a method comprising receiving an image geometry for an image within a GPU pipeline included in a GPU, and storing attributes for vertices within the image geometry in an extended vertex cache coupled to the GPU pipeline. The method further comprising processing the image within the GPU pipeline based on vertex coordinates that identify the vertices and vertex cache index values that indicate storage locations of the attributes in the extended vertex cache for each of the vertices within the image geometry.

In another embodiment, the disclosure provides a computer-readable medium comprising instructions that cause a programmable processor to receive an image geometry for an image within a GPU pipeline included in a GPU, and store attributes for vertices within the image geometry in an extended vertex cache coupled to the GPU pipeline. The instructions also cause the programmable processor to process the image within the GPU pipeline based on vertex coordinates that identify the vertices and vertex cache index values that indicate storage locations of the attributes in the extended vertex cache for each of the vertices within the image geometry.

In another embodiment, the disclosure provides a device comprising a GPU pipeline that receives vertices within an image geometry for an image and processes the image for display on a display device, and an extended vertex cache coupled to the GPU pipeline that stores attributes for vertices within the image geometry. The GPU pipeline processes the image based on vertex coordinates that identify the vertices and vertex cache index values that indicate storage locations of the attributes within the extended vertex cache for each of the vertices within the image geometry.

In a further embodiment, the disclosure provides a device comprising processing means for receiving an image geometry for an image, and storage means for storing attributes for vertices within the image geometry. The processing means processes the image based on vertex coordinates that identify the vertices and vertex cache index values that indicate storage locations of the attributes within the storage means for each of the vertices within the image geometry.

The techniques described herein may be implemented in hardware, software, firmware, or any combination thereof. If implemented in software, the techniques may be realized in whole or in part by a computer readable medium comprising instructions that, when executed by a processor, performs one or more of the methods described herein.

The details of one or more embodiments are set forth in the accompanying drawings and the description below. Other features, objects, and advantages of the invention will be apparent from the description and drawings, and from the claims.

DETAILED DESCRIPTION

Figure 1:
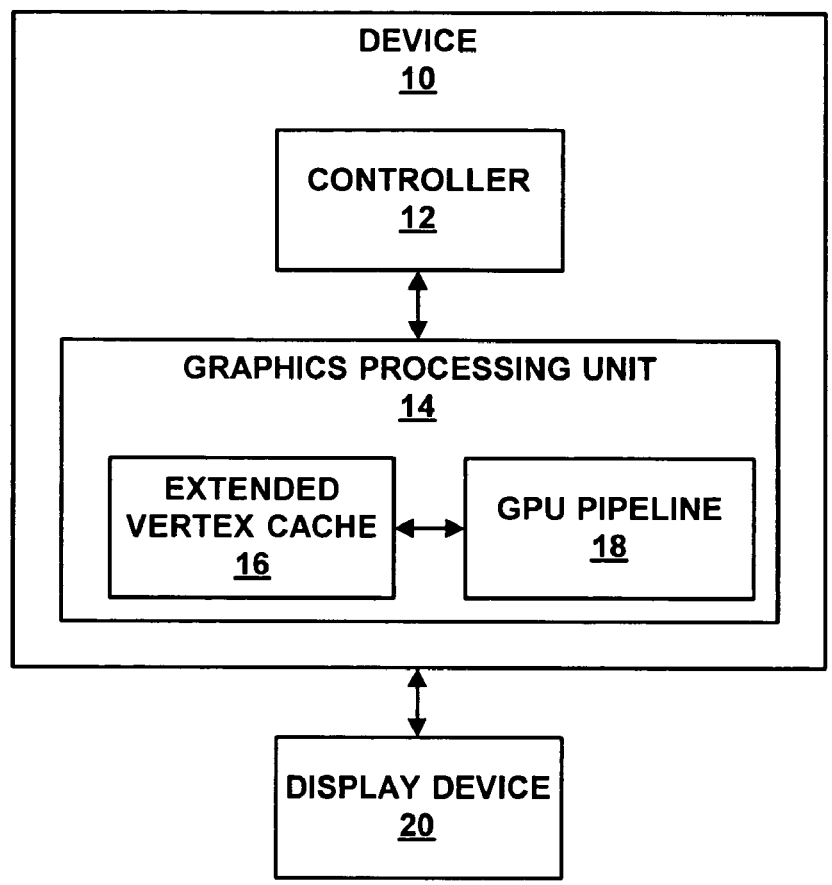
FIG. 1 is a block diagram illustrating an exemplary device including a graphics processing unit (GPU) that implements techniques for processing computerized images using an extended vertex cache.

FIG. 1 is a block diagram illustrating an exemplary device 10 including a graphics processing unit (GPU) 14 that implements techniques for processing computerized images using an extended vertex cache. In the example of FIG. 1, device 10 includes a controller 12 capable of controlling operation of GPU 14. Controller 12 may also be capable of controlling operation of device 10. In accordance with the techniques described herein, GPU 14 includes a GPU pipeline 18 and an extended vertex cache 16 coupled to GPU pipeline 18. Incorporation of extended vertex cache 16 may reduce an amount of data passing through GPU pipeline 18 within GPU 14.

GPU 14 receives an image geometry for an image from controller 12 within device 10. The image geometry may correspond to representations of complex, two-dimensional or three-dimensional computerized graphics. GPU 14 processes the image geometry to present image effects, background images, or video gaming images, for example, to a user of device 10 via a display device 20. The images may be formed as video frames in a sequence of video frames. Display device 20 may comprise a liquid crystal display (LCD), a cathode ray tube (CRT) display, a plasma display, or another type of display device integrated with or coupled to device 10.

In some cases, controller 12 may receive the image geometry from applications operating within device 10. For example, device 10 may comprise a computing device operating a video gaming application based on image geometry received from an internal hard drive or a removable data storage device. In other cases, controller 12 may receive the image geometry from applications operating external to device 10. For example, device 10 may comprise a computing device operating a video gaming application based on image geometry received from an external server via a wired or wireless network, such as the Internet. The image geometry may be received via streaming media or broadcast media, which may be wired, wireless or a combination of both.

When a user of device 10 triggers an image effect, selects a background image, or initiates a video game, controller 12 receives the corresponding image geometry from an application and sends the image geometry to GPU 14. GPU 14 processes the image geometry to prepare the corresponding image for presentation on display device 20. For example, GPU 14 may implement a number of primitive graphics operations, such as forming points, lines, and triangles, to create a three-dimensional image represented by the received image geometry on display device 20.

According to the techniques described herein, GPU pipeline 18 receives the image geometry for the image and stores attributes for vertices within the image geometry in extended vertex cache 16. GPU pipeline 18 only passes vertex coordinates that identify the vertices, and vertex cache index values that indicate storage locations of the attributes for each of the vertices in extended vertex cache 16 to other processing stages along GPU pipeline 18. In some embodiments, GPU pipeline 18 temporarily stores the vertex coordinates in extended vertex cache 16. In this manner, GPU pipeline 18 is not clogged with the transfer of the vertex attributes between stages, and can support increased throughput. The vertex coordinates identify the vertices within the image geometry based on, for example, a four-dimensional coordinate system with X, Y, and Z (width, height, and depth) coordinates that identify a location of a vertex within the image geometry, and a W coordinate that comprises a perspective parameter for the image geometry. The vertex attributes, for example, may include color, normal, and texture coordinates associated with a vertex.

GPU pipeline 18 within GPU 14 includes at least three major pipeline stages: a vertex shader stage, a primitive setup and interpolation stage, and a fragment shader stage. The primitive setup and interpolation stage in GPU pipeline 18 includes several sub-stages that each performs a function using either the vertex coordinates or the vertex attributes. For example, primitive setup and primitive rejection only utilize vertex coordinates to form primitives and discard a subset of the primitives that are unnecessary for the image. Primitives are the simplest types of geometric figures, including points, lines, triangles, and other polygons, and may be formed with one or more vertices within the image geometry. Primitives or portions of primitives may be rejected from consideration during processing of a specific frame of the image when the primitives or the portions of primitives are invisible (e.g., located on a backside of an object) within the image frame, or are hidden (e.g., located behind another object or transparent) within the image frame.

As another example, attribute gradient setup and attribute interpolation utilize the vertex attributes to compute attribute gradient values and interpolate the attributes based on the attribute gradient values. Techniques described in this disclosure defer the computationally intensive setup of attribute gradients to just before attribute interpolation in GPU pipeline 18. The vertex attributes may be retrieved from extended vertex cache 16 for attribute gradient setup as one of the last steps before attribute interpolation in GPU pipeline 18. In this way, the vertex attributes are not introduced to GPU pipeline 18 until after primitive setup and primitive rejection.

Storing the attributes for vertices within the image geometry in extended vertex cache 14 enables GPU pipeline 18 to only move the primitives for the image geometry, the vertex coordinates that identify each of the vertices within the primitives, and vertex cache index values that indicate storage locations of the attributes within the extended vertex cache for each of the vertices within the primitives. Removing the large amount of attribute data from GPU pipeline 18 may substantially eliminate bottlenecks in GPU pipeline 18 for primitives that include large numbers of attributes. In addition, deferring the attribute gradient setup to just before attribute interpolation in GPU pipeline 18 may improve image processing speed within GPU pipeline 18. More specifically, deferring the attribute gradient setup within GPU pipeline 18 until after rejection of the subset of the primitives that are unnecessary for the image may substantially reduce computations and power consumption as the attribute gradient setup will only be performed on a subset of the primitives that are necessary for the image.

In the embodiment illustrated in FIG. 1, display device 20 comprises a separate device from device 10. Display device 20 may be coupled to device 10 either wirelessly or with a wired connection. For example, device 10 may comprise a server or other computing device of a wireless communication service provider, and display device 20 may be included within a wireless communication device. In this case, as examples, display device 20 may comprise a display within a mobile radiotelephone, a satellite radiotelephone, a portable computer with a wireless communication card, a personal digital assistant (PDA) equipped with wireless communication capabilities, or any of a variety of devices capable of wireless communication. As another example, device 10 may comprise a server or other computing device connected to display device 20 via a wired network, and display device 20 may be included within a wired communication device or a device not principally directed to communication.

In other embodiments, display device 20 may be integrated within device 10. For example, device 10 may comprise a wireless communication device and display device 20 may comprise a display within the wireless communication device. As another example, device 10 may comprise a desktop or notebook computer, and display device 20 may comprise a dedicated monitor or display of the computer. Device 10 may also comprise a wired communication device or a device not principally directed to communication, and display device 20 may comprise a display within the device. For example, device 10 may comprise a PDA or handheld video game device that includes display device 20. Hence, in various embodiments, computerized video imagery may be obtained from a remote device or from a local device, each of which may be a video server that generates video or video objects, or a video archive that retrieves stored video or video objects.

Figure 2:
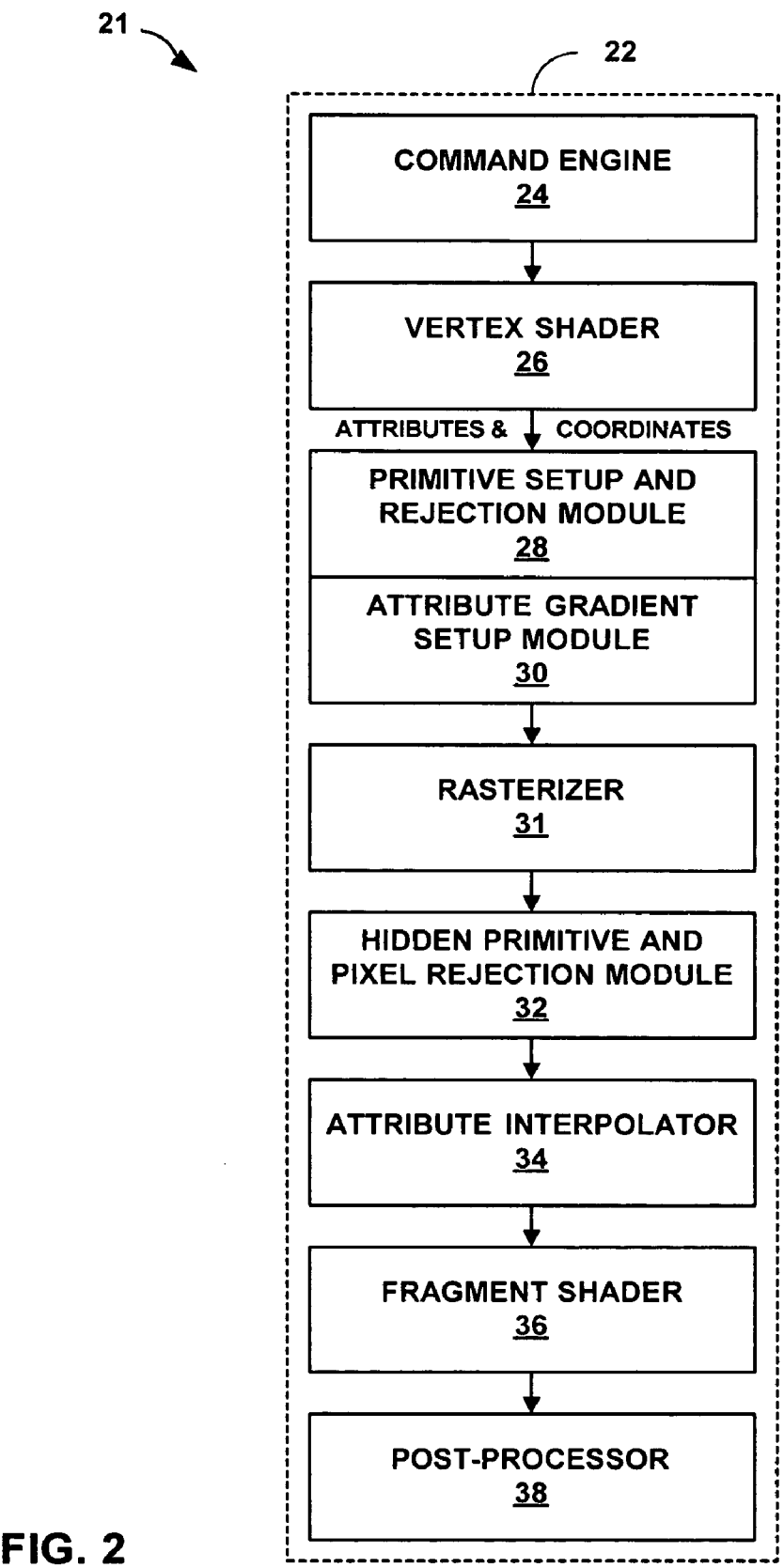
FIG. 2 is a block diagram illustrating a GPU pipeline within a conventional GPU.

FIG. 2 is a block diagram illustrating a GPU pipeline 22 within a conventional GPU 21. Conventional GPU 21 may be included within a device substantially similar to device 10 from FIG. 1. GPU pipeline 22 includes a command engine 24, a vertex shader 26, a primitive setup and rejection module 28, an attribute gradient setup module 30, a rasterizer 31, a hidden primitive and pixel rejection module 32, an attribute interpolator 34, a fragment shader 36, and a post processor 38. Command engine 24 receives an image geometry and rendering commands for an image from a controller of the device in which conventional GPU 21 resides. The image geometry may correspond to representations of complex, two-dimensional or three-dimensional computerized graphics. Command engine 24 passes the image geometry and rendering commands along GPU pipeline 22 to the other processing stages.

GPU pipeline 22 includes at least three major pipeline stages: a vertex shader stage, a primitive setup and interpolation stage, and a fragment shader stage. Vertex shader 26 is applied to the image geometry and determines surface properties of the image at vertices within the image geometry. In this way, vertex shader 26 generates vertex coordinates and attributes of each of the vertices within the image geometry. The vertex coordinates identify the vertices within the image geometry based on, for example, a four-dimensional coordinate system with X, Y, and Z (width, height, and depth) coordinates that identify a location of a vertex within the image geometry, and a W coordinate that comprises a perspective parameter for the image geometry. The vertex attributes, for example, may include color, normal, and texture coordinates associated with a vertex. Vertex shader 26 within conventional GPU 21 may also include an integrated vertex cache.

The primitive setup and interpolation stage in GPU pipeline 26 includes sub-stages, primitive setup and rejection module 28, attribute gradient setup module 30, rasterizer 31, hidden primitive and pixel rejection module 32, and attribute interpolator 34, that each use either the vertex coordinates or the vertex attributes to process the image geometry. In order for the other processing stages in GPU pipeline 22 to receive the necessary inputs, the vertex coordinates and the vertex attributes of all of the vertices within the image geometry are passed along GPU pipeline 22. Therefore, GPU pipeline 22 must move a large amount of data, which requires conventional GPU 21 to include a wide internal data bus to meet the data throughput. In addition, First In, First Out (FIFO) buffers and other types of buffers are included between each of the processing stages in GPU pipeline 22 to balance the pipeline stages by storing the vertex attributes.

Primitive setup and rejection module 28 forms primitives with one or more vertices within the image geometry. Primitives are the simplest types of geometric figures and may include points, lines, triangles, and other polygons. Primitive setup and rejection module 28 may also reject primitives by performing scissoring and backface culling using the XY coordinates of the vertices within the primitives. Scissoring and backface culling reject primitives and portions of primitives from consideration during processing of a specific frame of the image when the primitives and the portions of primitives are invisible within the image frame. For example, the primitives and the portions of primitives may be located on a backside of an object within the image frame. Primitive setup and rejection module 28 may disregard attributes of vertices associated with the rejected primitives within the image geometry. Moving the vertex attributes through each of the processing stages in GPU pipeline 22 may create a bottleneck for primitives that include large numbers of attributes.

Attribute gradient setup module 30 computes gradients of attributes associated with the primitives for the image geometry. An attribute gradient comprises a difference between the attribute value at a first pixel and the attribute value at a second pixel within a primitive moving in either a horizontal (X) direction or a vertical (Y) direction. Attribute gradient setup module 30 utilizes the vertex attributes to compute the attribute gradients. The attribute gradient setup processing step is computationally intensive and may slow down image processing within GPU pipeline 22. The attribute gradient setup rate heavily depends on the number of vertex attributes associated with the primitives regardless of the number of pixels included in the primitives.

Once the attribute gradient values are computed, rasterizer 31 converts the primitives for the image geometry into pixels based on the XY coordinates of each of the vertices within the primitives and the number of pixels included in the primitives. Hidden primitive and pixel rejection module 32 rejects hidden primitives and hidden pixels within the primitives using the early depth and stencil test based on the Z coordinates of the vertices within the primitives. Primitives or pixels within primitives may be considered hidden, and be rejected from consideration during processing of a specific frame of the image, when the primitives or the pixels within primitives are located behind another object within the image frame or are transparent within the image frame.

Attribute interpolator 34 interpolates the attributes over pixels within the primitives based on the attribute gradient values. Attribute interpolator 34 may disregard attributes of vertices associated with rejected primitives within the image geometry. The interpolated attribute values are then input to fragment shader 36 to perform pixel rendering of the primitives. Fragment shader 36 determines surface properties of the image at pixels within the primitives for the image geometry. Results of fragment shader 36 will be output to post-processor 38 for presentation of the processed image on a display device.

Figure 3:
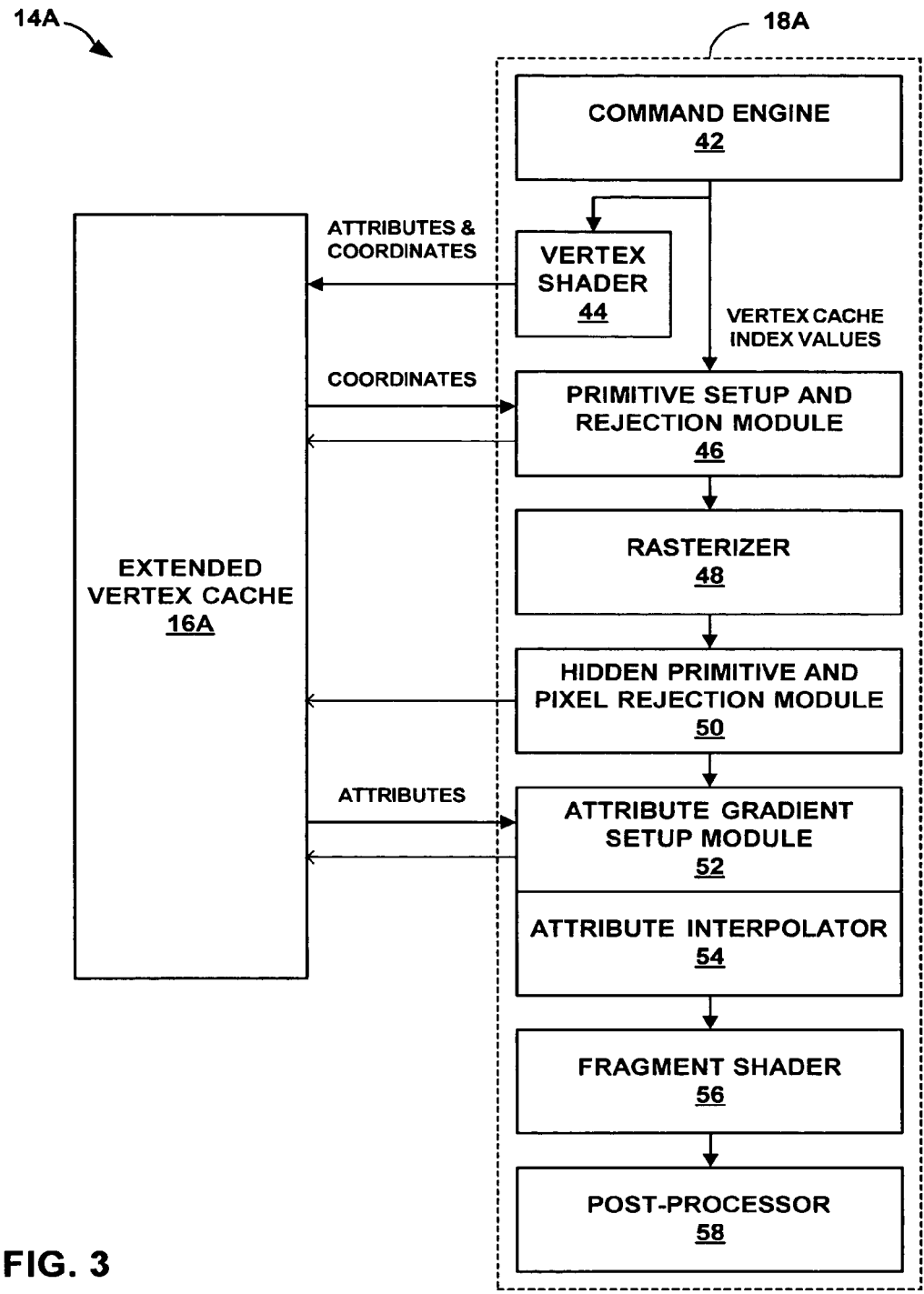
FIG. 3 is a block diagram illustrating a GPU, an exemplary embodiment of the GPU from FIG. 1, including a GPU pipeline and an extended vertex cache coupled to the GPU pipeline.

FIG. 3 is a block diagram illustrating a GPU 14A, an exemplary embodiment of GPU 14 from FIG. 1, including a GPU pipeline 18A and an extended vertex cache 16A coupled to GPU pipeline 18A. Utilizing extended vertex cache 16A within GPU 14A may reduce an amount of data passing through GPU pipeline 18A within GPU 14A. In the illustrated embodiment, GPU pipeline 18A includes a command engine 42, a vertex shader 44, a primitive setup and rejection module 46, a rasterizer 48, a hidden primitive and pixel rejection module 50, an attribute gradient setup module 52, an attribute interpolator 54, a fragment shader 56, and a post processor 58.

Command engine 42 receives an image geometry and rendering commands for an image from controller 12 of device 10. The image geometry may correspond to representations of complex, two-dimensional or three-dimensional computerized graphics. Command engine 42 passes information for vertices within the image geometry that are not included in extended vertex cache 16A ("missed vertices") to vertex shader 44. Command engine 42 passes information for vertices within the image geometry that are already included in extended vertex cache 16A ("hit vertices") to primitive setup and rejection module 46. Initial processing of hit and missed vertices within the image geometry is described in more detail below.

GPU pipeline 18A includes at least three major pipeline stages: a vertex shader stage, a primitive setup and interpolation stage, and a fragment shader stage. Vertex shader 44 is applied to the missed vertices within the image geometry and determines surface properties of the image at the missed vertices within the image geometry. In this way, vertex shader 44 generates vertex coordinates and attributes of each of the missed vertices within the image geometry. Vertex shader 44 then stores the attributes for the missed vertices in extended vertex cache 16A. Vertex shader 44 is not applied to each of the hit vertices within the image geometry as vertex coordinates and attributes of each of the hit vertices were previously generated and stored in extended vertex cache 16A.

The vertex coordinates identify the vertices within the image geometry based on, for example, a four-dimensional coordinate system with X, Y, and Z (width, height, and depth) coordinates that identify a location of a vertex within the image geometry, and a W coordinate that comprises a perspective parameter for the image geometry. The vertex attributes, for example, may include color, normal, and texture coordinates associated with a vertex. Extended vertex cache 16A may be easily configured for different numbers of attributes and primitive types. Vertex cache index values that indicate storage locations within extended vertex cache 16A of the vertex coordinates and attributes for both the hit and missed vertices in the image geometry are then placed in a FIFO buffer (not shown) positioned between command engine 42 and primitive setup and rejection module 46.

The primitive setup and interpolation stage in GPU pipeline 18A includes sub-stages, primitive setup and rejection module 46, rasterizer 48, hidden primitive and pixel rejection module 50, attribute gradient setup module 52, and attribute interpolator 54, that each uses either the vertex coordinates or the vertex attributes to process the image geometry. For example, primitive setup and rejection module 46, rasterizer 48, and hidden primitive and pixel rejection module 50 only utilize the vertex coordinates. However, attribute gradient setup module 52 and attribute interpolator 54 utilize the vertex attributes. Therefore, attribute gradient setup module 52 is deferred to just before attribute interpolator 54 in GPU pipeline 18A. The vertex attributes may be retrieved from extended vertex cache 16A for attribute gradient setup module 52 as one of the last steps in GPU pipeline 18A before interpolating the attributes with attribute interpolator 54. In this way, the vertex attributes are not introduced to GPU pipeline 18A until after hidden primitive and pixel rejection module 50, and just before attribute interpolator 54, providing significant gains in efficiency.

Storing the vertex attributes for the vertices within the image geometry in extended vertex cache 16A eliminates a large amount of data from passing through GPU pipeline 18A, which reduces the width of the internal data bus included in GPU 18A. Reducing the amount of data movement may also reduce power consumption within GPU 18A. In addition, with the exception of the FIFO buffer positioned between command engine 42 and primitive setup and rejection module 46, FIFO buffers or other types of buffers positioned between each of the processing stages may be removed from GPU pipeline 18A to reduce the area of GPU 14A within device 10.

Primitive setup and rejection module 46 receives the vertex cache index values for the attributes of each of the vertices in the image geometry from the FIFO buffer. Primitive setup and rejection module 46 then retrieves vertex coordinates for each of the vertices within the image geometry using the vertex cache index values. Primitive setup and rejection module 46 forms primitives with one or more vertices within the image geometry. Primitives are the simplest types of geometric figures and may include points, lines, triangles, and other polygons.

Primitive setup and rejection module 46 may also reject primitives by performing scissoring and backface culling using the XY coordinates of the vertices within the image geometry. Scissoring and backface culling reject primitives and portions of primitives from consideration during processing of a specific frame of the image when the primitives and the portions of primitives are invisible within the image frame. For example, the primitives and the portions of primitives may be located on a backside of an object within the image frame. Primitive setup and rejection module 46 may request extended vertex cache 16A to release storage space for the attributes associated with the rejected primitives. Only moving the primitives for the image geometry, the vertex coordinates associated with the primitives, and the vertex cache index values for each of the vertices within the primitives through GPU pipeline 18A substantially eliminates bottlenecks in GPU pipeline 18A for primitives that include large numbers of attributes.

Rasterizer 48 converts the primitives for the image geometry into pixels based on the XY coordinates of vertices within the primitives and the number of pixels included in the primitives. Hidden primitive and pixel rejection module 50 rejects hidden primitives and hidden pixels within the primitives using the early depth and stencil test based on the Z coordinates of the vertices within the primitives. If hidden primitive and pixel rejection module 50 rejects all pixels within a primitive, the primitive is automatically rejected. Primitives or pixels within primitives may be considered hidden, and be rejected from consideration during processing of a specific frame of the image, when the primitives or the pixels within primitives are located behind another object within the image frame or are transparent within the image frame. Hidden primitive and pixel rejection module 50 may request extended vertex cache 16A to release storage space for the attributes associated with the rejected primitives.

Typically, a large percentage of primitives are rejected by scissoring and backface culling performed by primitive setup and rejection module 46, and the early depth and stencil test performed by hidden primitive and pixel rejection module 50. Therefore, deferring the attribute gradient setup until after all the primitive rejection is performed eliminates attribute gradient computations for attributes associated with a subset of the primitives that are unnecessary for the image.

Attribute gradient setup module 52 retrieves the vertex attributes from extended vertex cache 16A using the vertex cache index values for each of the vertices within the primitives. Attribute gradient setup module 52 computes gradients of attributes associated with the primitives for the image geometry. An attribute gradient comprises a difference between the attribute value at a first pixel and the attribute value at a second pixel within a primitive moving in either a horizontal (X) direction or a vertical (Y) direction. After attribute gradient setup module 52 computes gradients of attributes of all vertices within a primitive for the image geometry, attribute gradient setup module 52 may request extended vertex cache 16A to release storage space for the attributes of the vertices within the primitive.

Once the attribute gradient values are computed, attribute interpolator 54 interpolates the attributes over pixels within the primitives based on the attribute gradient values. The interpolated attribute values are then input to fragment shader 56 to perform pixel rendering of the primitives. Fragment shader 56 determines surface properties of the image at pixels within the primitives for the image geometry. Results of fragment shader 56 will be output to post-processor 58 for presentation of the processed image on display device 20.

Deferring the computationally intensive attribute gradient setup processing step to just before attribute interpolation in GPU pipeline 18A may improve image processing speed within GPU pipeline 18A and reduce power consumption within GPU 14A. In addition, deferring the attribute gradient setup processing step to just before attribute interpolation in GPU pipeline 18A eliminates the need for storage buffers between processing stages within GPU pipeline 18A to compensate latency of the rasterizer and primitive rejection processing steps due to large amounts of data. The deferred attribute gradient setup module 52 may share an arithmetic logic unit (ALU) with attribute interpolator 54 to save gates. GPU 18A may utilize less gates or improve the efficiency for the current gates.

In some cases, vertex shader 44 may not be applied to missed vertices within the image geometry. It may be assumed that vertex coordinates and attributes of all vertices within the image geometry are determined external to GPU pipeline 18A. Therefore, primitives formed with the missed vertices do not need vertex shader 44 to calculate attributes of the missed vertices. In this case, extended vertex cache 16A may operate as an extended vertex buffer. Command engine 42 may assign vertex index values that identify storage location for the attributes within the extended vertex buffer and send the predetermined vertex coordinates and attributes of each of the vertices within the image geometry to the extended vertex buffer.

Figure 4:
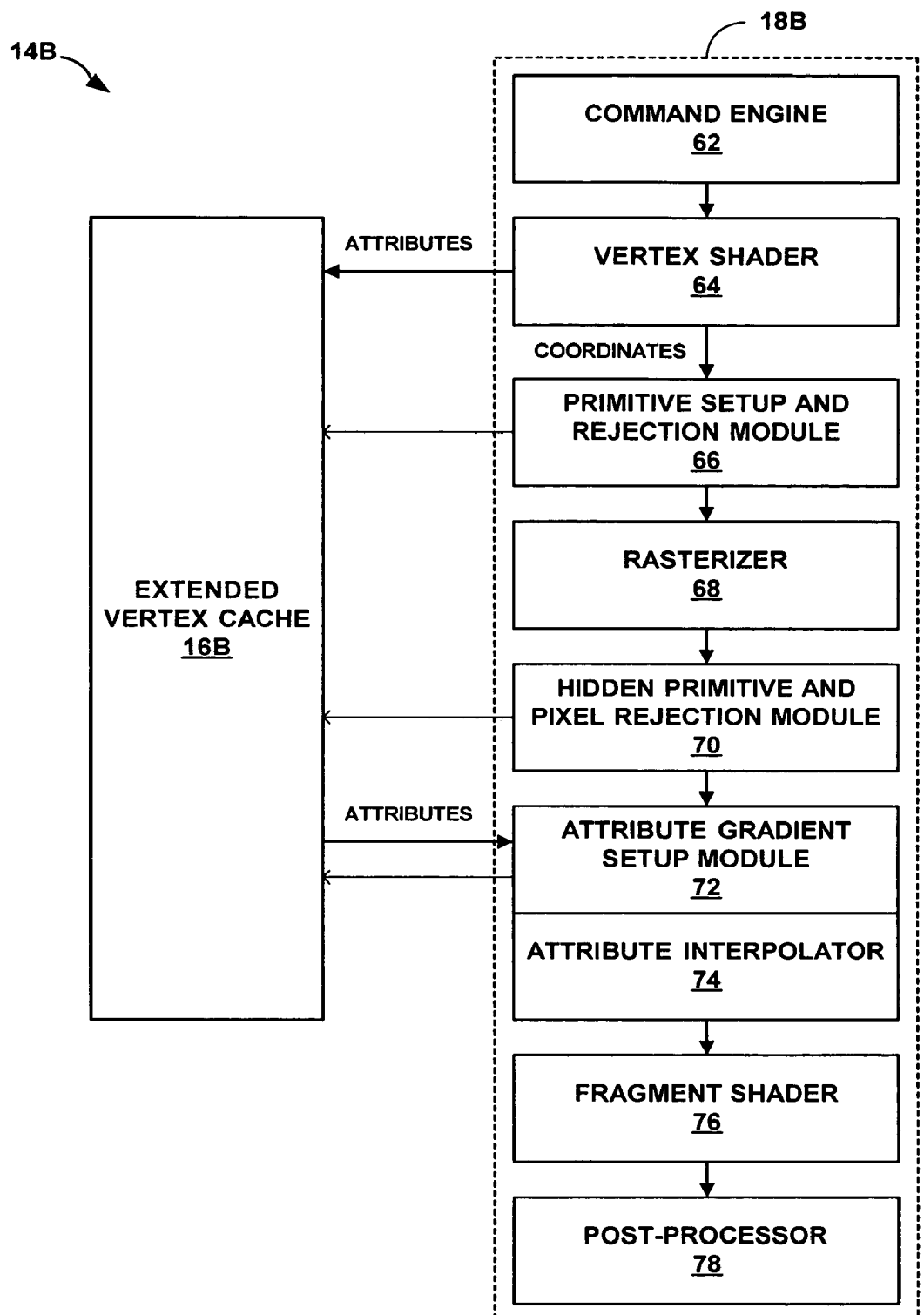
FIG. 4 is a block diagram illustrating a GPU, another exemplary embodiment of the GPU from FIG. 1, including a GPU pipeline and an extended vertex cache coupled to the GPU pipeline.

FIG. 4 is a block diagram illustrating GPU 14B, another exemplary embodiment of GPU 14 from FIG. 1, including a GPU pipeline 18B and an extended vertex cache 16B coupled to GPU pipeline 18B. In the illustrated embodiment, GPU pipeline 18B includes a command engine 62, a vertex shader 64, a primitive setup and rejection module 66, a rasterizer 68, a hidden primitive and pixel rejection module 70, an attribute gradient setup module 72, an attribute interpolator 74, a fragment shader 76, and a post-processor 78. GPU 14B illustrated in FIG. 4 may operate substantially similar to GPU 14A illustrated in FIG. 3, except for the initial processing of vertices in the image geometry.

Command engine 62 receives an image geometry and rendering commands for an image from controller 12 of device 10. Command engine 62 passes the image geometry and rendering commands along GPU pipeline 18B to the other processing stages. In other words, command engine 62 passes information for all the vertices within the image geometry to vertex shader 64.

In the present embodiment vertex shader 64 is applied to all vertices within the image geometry. Vertex shader 64 is applied to the image geometry and determines surface properties of the image at the vertices within the image geometry. In this way, vertex shader 64 generates vertex coordinates and attributes of each of the vertices within the image geometry. Vertex shader 64 then stores only the attributes in extended vertex cache 16B. Vertex shader 64 passes the vertex coordinates and vertex cache index values that indicate storage locations of the attributes within extended vertex cache 16B for each of the vertices in the image geometry along GPU pipeline 18B.

Since vertex shader 64 passes the vertex coordinates and vertex cache index values for the vertices in the image geometry directly to primitive setup and rejection module 66, all the FIFO buffers or other types of buffers positioned between each of the processing stages may be removed from GPU pipeline 18B. Primitive setup and rejection module 66 forms primitives with one or more vertices within the image geometry. Primitive setup and rejection module 66 may also reject primitives by performing scissoring and backface culling using the XY coordinates of the vertices within the image geometry. Primitive setup and rejection module 46 may request extended vertex cache 16B to release storage space for the attributes associated with the rejected primitives.

Rasterizer 68 converts the primitives for the image geometry into pixels based on the XY coordinates of vertices within the primitives and the number of pixels included in the primitives. Hidden primitive and pixel rejection module 70 rejects hidden primitives and hidden pixels within the primitives using the early depth and stencil test based on the Z coordinates of the vertices within the primitives. Hidden primitive and pixel rejection module 70 may request extended vertex cache 16B to release storage space for the attributes associated with the rejected primitives.

Attribute gradient setup module 72 retrieves the vertex attributes from extended vertex cache 16B using the vertex cache index values for each of the vertices within the primitives. Attribute gradient setup module 72 computes gradients of attributes associated with the primitives for the image geometry. After attribute gradient setup module 72 computes gradients of attributes of all vertices within a primitive for the image geometry, attribute gradient setup module 72 may request extended vertex cache 16B to release storage space for the attributes of the vertices within the primitive.

Once the attribute gradient values are computed, attribute interpolator 74 interpolates the attributes over pixels within the primitives based on the attribute gradient values. The interpolated attribute values are then input to fragment shader 76 to perform pixel rendering of the primitives. Fragment shader 76 determines surface properties of the image at pixels within the primitives for the image geometry. Results of fragment shader 76 will be output to post-processor 78 for presentation of the processed image on display device 20.

Figure 5:
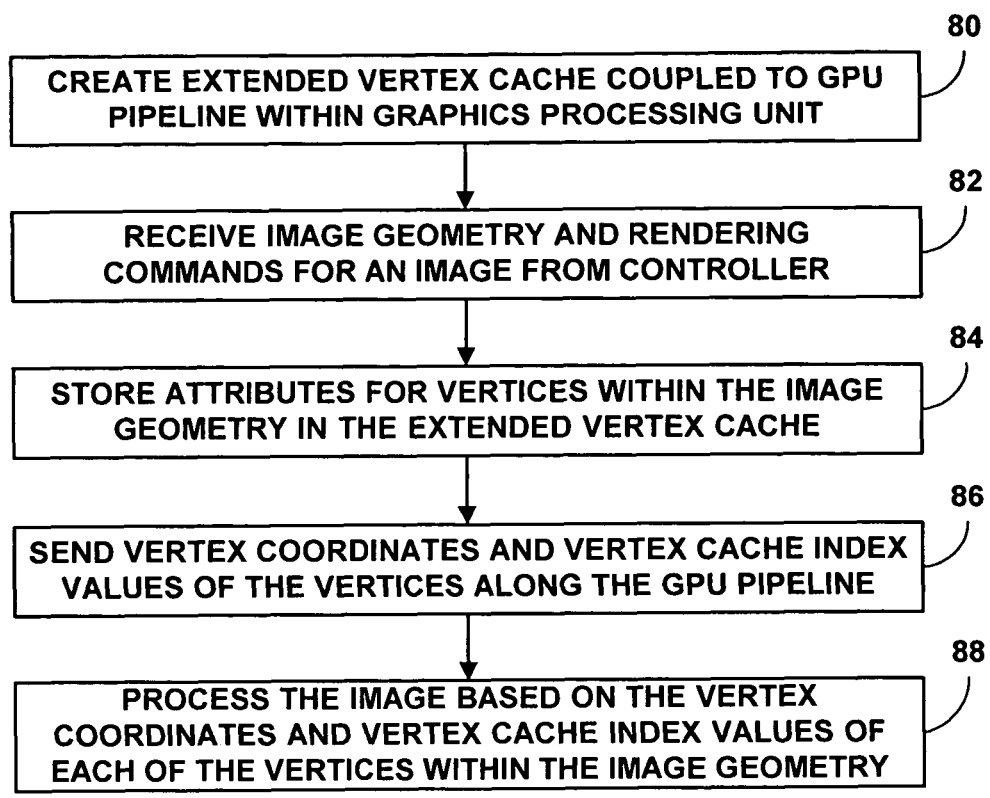
FIG. 5 is a flowchart illustrating an exemplary operation of processing an image within a GPU using an extended vertex cache.

FIG. 5 is a flowchart illustrating an exemplary operation of processing an image within a GPU using an extended vertex cache. The operation will be described herein in reference to GPU 14 from FIG. 1. Extended vertex cache 16 may be created within GPU 14 during manufacture of device 10 and coupled to GPU pipeline 18 (80). Extended vertex cache 16 may be easily configured for different numbers of attributes and primitive types.

GPU 14 receives image geometry and rendering commands for an image from controller 12 of device 10 (82). The image geometry may correspond to representations of complex, two-dimensional or three-dimensional computerized graphics. GPU 14 sends the image geometry and rendering commands to GPU pipeline 18 to process the image for display on display device 20 connected to device 10. GPU pipeline 18 stores attributes for vertices within the image geometry in extended vertex cache 16 (84). In some embodiments, GPU pipeline 18 temporarily stores vertex coordinates for the vertices within the image geometry in extended vertex cache 16.

GPU pipeline 18 then sends vertex coordinates that identify the vertices, and vertex cache index values that indicate storage locations of the attributes for each of the vertices in extended vertex cache 16 to other processing stages along GPU pipeline 18 (86). GPU pipeline 18 processes the image based on the vertex coordinates and the vertex cache index values for each of the vertices in the image geometry (88).

Figure 6:
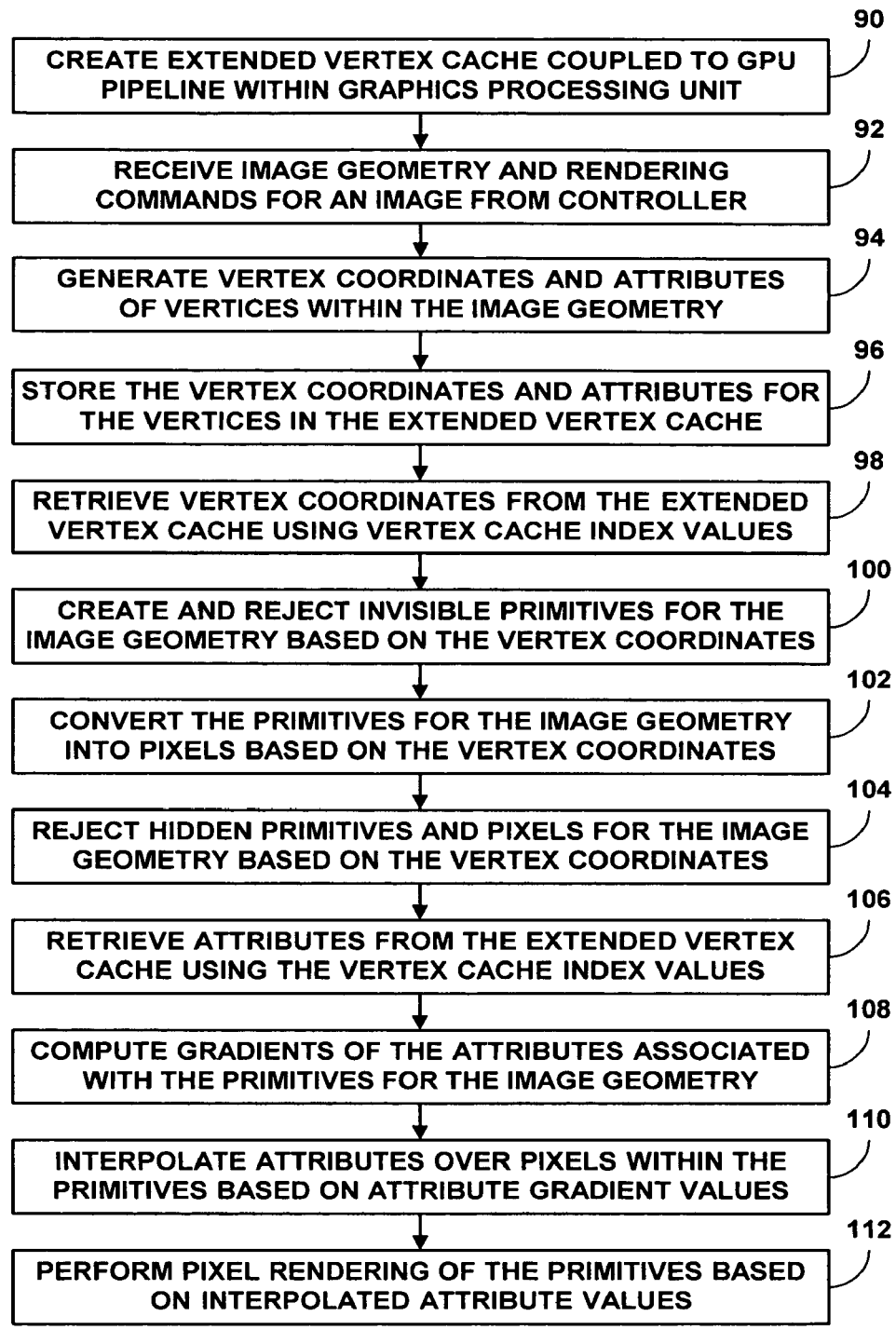
FIG. 6 is a flowchart illustrating another exemplary operation of processing an image with a GPU using an extended vertex cache.

FIG. 6 is a flowchart illustrating another exemplary operation of processing an image with a GPU using an extended vertex cache. The operation will be described herein in reference to GPU 14A from FIG. 3. Extended vertex cache 16A may be created within GPU 14A during manufacture of device 10 and coupled to GPU pipeline 18A (90). Extended vertex cache 16A may be easily configured for different numbers of attributes and primitive types.

Command engine 42 receives image geometry and rendering commands for an image from controller 12 of device 10 (92). The image geometry may correspond to representations of complex, two-dimensional or three-dimensional computerized graphics. Command engine 42 passes information for vertices within the image geometry that are not included in extended vertex cache 16A ("missed vertices") to vertex shader 44. Command engine 42 passes information for vertices within the image geometry that are already included in extended vertex cache 16A ("hit vertices") to primitive setup and rejection module 46.

Vertex shader 44 is applied to the missed vertices within the image geometry and generates vertex coordinates and attributes of each of the missed vertices within the image geometry (94). Vertex shader 44 then stores the vertex coordinates and attributes for the missed vertices in extended vertex cache 16A (96). Vertex shader 44 is not applied to each of the hit vertices within the image geometry as vertex coordinates and attributes of each of the hit vertices were previously generated and stored in extended vertex cache 16A. Vertex cache index values that indicate storage locations within extended vertex cache 16A of the attributes for both the hit and missed vertices in the image geometry are then placed in a FIFO buffer positioned between command engine 42 and primitive setup and rejection module 46.

Primitive setup and rejection module 46 receives the vertex cache index values for the attributes of each of the vertices in the image geometry from the FIFO buffer. Primitive setup and rejection module 46 then retrieves vertex coordinates for each of the vertices within the image geometry from extended vertex cache 16A using the vertex cache index values (98). Primitive setup and rejection module 46 creates primitives with one or more vertices within the image geometry, and rejects primitives based on the XY coordinates of the vertices within the image geometry (100). Primitive setup and rejection module 46 may request extended vertex cache 16A to release storage space for the attributes associated with the rejected primitives.

Rasterizer 48 converts the primitives for the image geometry into pixels based on the XY coordinates of the vertices within the primitives and the number of pixels included in the primitives (102). Hidden primitive and pixel rejection module 50 rejects hidden primitives and hidden pixels within primitives for the image based on the Z coordinates of the vertices within the primitives (104). Hidden primitive and pixel rejection module 50 may request extended vertex cache 16A to release storage space for the attributes associated with the rejected primitives.

Attribute gradient setup module 52 retrieves the vertex attributes from extended vertex cache 16A using the vertex cache index values for the vertices within primitives (106). Attribute gradient setup module 52 computes gradients of attributes associated with the primitives for the image geometry (108). After attribute gradient setup module 52 computes gradients of attributes of all vertices within a primitive for the image geometry, attribute gradient setup module 52 may request extended vertex cache 16 to release storage space for the attributes of the vertices within the primitive. Once the attribute gradient values are computed, attribute interpolator 54 interpolates the attributes over pixels within the primitives based on the attribute gradient values (110). Fragment shader 56 performs pixel rendering of the primitives for the image geometry based on the interpolated attribute values (112). Fragment shader 56 determines surface properties of the image at pixels within the primitives for the image geometry. Results of fragment shader 56 will be output to post-processor 58 for presentation of the processed image on display device 20 coupled to device 10.

Figure 7:
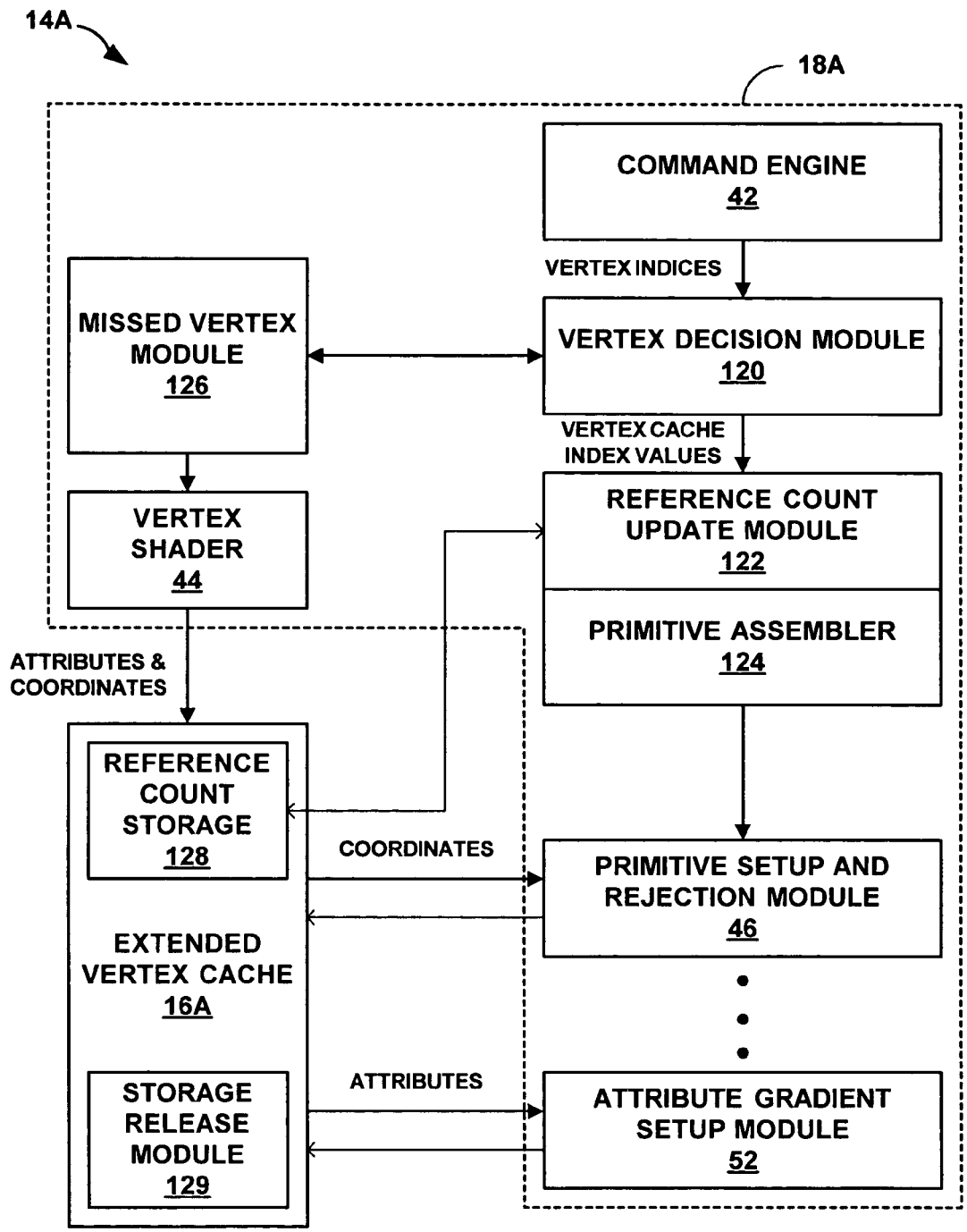
FIG. 7 is a block diagram illustrating the GPU from FIG. 3 in greater detail including components for initial processing of vertices within an image geometry.

FIG. 7 is a block diagram illustrating GPU 14A from FIG. 3 in greater detail including components for initial processing of vertices within an image geometry. In the illustrated embodiment, GPU pipeline 18A includes a vertex decision module 120, a reference count update module 122, and a primitive assembler 124 positioned between command engine 42 and primitive setup and rejection module 46. In addition, GPU pipeline 18A includes a missed vertex module 126 between vertex decision module 120 and vertex shader 44. Extended vertex cache 16A includes reference count storage 128 and a storage release module 129.

Command engine 42 receives an image geometry and rendering commands for an image from controller 12 of device 10. Command engine 42 then sends vertex indices for vertices within the image geometry to vertex decision module 120. The vertex indices for each of the vertices within the image geometry may be generated by controller 12 of device 10 or by command engine 42. Vertex decision module 120 determines whether each of the vertices within the image geometry are included in extended vertex cache 16A based on the corresponding vertex indices. Vertices within the image geometry that are not included in extended vertex cache 16A are referred to herein as "missed vertices". Vertices within the image geometry that are already included in extended vertex cache 16A are referred to herein as "hit vertices"

In the case of hit vertices, vertex decision module 120 provides the vertex cache index values that indicate storage locations in extended vertex cache 16A of the vertex coordinates and attributes for each of the hit vertices to reference count update module 122 within GPU pipeline 18A. In the case of missed vertices, vertex decision module 120 sends a request for storage space in extended vertex cache 16A to missed vertex module 126 for each of the missed vertices. Missed vertex module 126 assigns vertex cache index values to each of the missed vertices that indicate storage locations of vertex coordinates and attributes for the missed vertices in extended vertex cache 16A. Vertex decision module 120 then provides the vertex cache index values that indicate storage locations in extended vertex cache 16A of the vertex coordinates and attributes for the missed vertices to reference count update module 122 within GPU pipeline 18A.

Missed vertex module 126 reads information for the missed vertices and performs related format conversions. For example, the format conversions may comprise integer to float conversions, 16 bit float to 32 bit float conversions, or other types of format conversions. Missed vertex module 126 forms a vertex thread based on the information for the missed vertices, and sends the vertex thread to vertex shader 44. Vertex shader 44 is applied to each of the missed vertices and generates vertex coordinates and attributes of the missed vertices within the image geometry. Vertex shader 44 then stores the vertex coordinates and attributes for the missed vertices at the assigned storage locations in extended vertex cache 16A.

Upon receiving the vertex cache index values for the missed vertices, reference count update module 122 initializes reference counts within reference count storage 128 for each of the missed vertices to zero. Reference update module 122 then increments the reference counts within reference count storage 128 for all the vertices, hit and missed, within the image geometry by one.

Primitive assembler 124 forms preliminary primitives with one or more vertices within the image geometry. When primitive assembler 124 assembles a preliminary primitive in which each of the vertices are only used once, reference counts within reference count storage 128 for the vertices are not incremented and remain unchanged. When primitive assembler 124 assembles a preliminary primitive in which at least one of the vertices is used more than once, primitive assembler 124 increments a reference count within reference count storage 128 for the at least one vertex by one each time the vertex is reused. For example, if the vertex is used twice in the primitive, the reference count within reference count storage 128 for the vertex will be incremented by one to be equal to two. Primitive assembler 124 places the vertex cache index values for the vertices within the preliminary primitives in a FIFO buffer positioned between primitive assembler 124 and primitive setup and rejection module 46.

Primitive setup and rejection module 46 receives the vertex cache index values for the attributes of each of the vertices in the image geometry from the FIFO buffer. Primitive setup and rejection module 46 then retrieves vertex coordinates for each of the vertices within the image geometry from extended vertex cache 16A using the vertex cache index values. More specifically, primitive setup and rejection module 46 may utilize the vertex cache index values to check if all vertices within a given primitive are available in extended vertex cache 16A. If the vertices are not ready, primitive setup and rejection module 46 will wait. Once the vertices are ready, primitive setup and rejection module reads vertex coordinates for each of the vertices within the primitive based on the corresponding vertex cache index values.

Primitive setup and rejection module 46 processes the image based on the retrieved vertex coordinates for each of the vertices within the image geometry. Primitive setup and rejection module 46 creates primitives with one or more vertices within the image geometry, and rejects primitives based on the XY coordinates of the vertices within the image geometry. When primitive setup and rejection module 46 rejects a primitive for the image geometry, primitive setup and rejection module 46 sends a request to storage release module 129 to release storage space in extended vertex cache 16A for the attributes of the vertices within the rejected primitive. Upon receiving the request, storage release module 129 decrements reference counts within reference count storage 128 for the vertices within the rejected primitive by one. If the reference counts within reference count storage 128 are decremented to zero, storage release module 129 releases the storage space in extended vertex cache 16A for the attributes of the vertices within the rejected primitive.

Primitive setup and rejection module 46 then passes the vertex coordinates and vertex cache index values for each of the vertices in the image geometry along GPU pipeline 18A. The processing stages within GPU pipeline 18A process the image based on the vertex coordinates for the vertices within the image geometry as described above. For example, hidden primitive and pixel rejection module 50 rejects hidden primitives and hidden pixels within the primitives using the early depth and stencil test based on the Z coordinates of the vertices within the primitives. Substantially similar to primitive setup and rejection module 46, when hidden primitive and pixel rejection module 50 rejects a primitive for the image geometry, hidden primitive and pixel rejection module 50 sends a request to storage release module 129 to release storage space in extended vertex cache 16A for the attributes of the vertices within the rejected primitive. Upon receiving the request, storage release module 129 decrements reference counts within reference count storage 128 for the vertices within the rejected primitive by one. If the reference counts within reference count storage 128 are decremented to zero, storage release module 129 releases the storage space in extended vertex cache 16A for the attributes of the vertices within the rejected primitive.

Attribute gradient setup module 52 retrieves the vertex attributes from extended vertex cache 16A using the vertex cache index values for the vertices within the primitives. Attribute gradient setup module 52 processes the image based on the retrieved attributes of each of the vertices within the image geometry. Attribute gradient setup module 52 computes gradients of attributes associated with the primitives for the image geometry. After attribute gradient setup module 52 computes gradients of attributes of all vertices within a primitive for the image geometry, attribute gradient setup module 52 sends a request to storage release module 129 to release storage space in extended vertex cache 16A for the attributes of the vertices within the primitive. Upon receiving the request, storage release module 129 decrements reference counts within reference count storage 128 for the vertices within the primitive by one. If the reference counts within reference count storage 128 are decremented to zero, storage release module 129 releases the storage space in extended vertex cache 16A for the attributes of the vertices within the primitive. The remaining processing stages within GPU pipeline 18A process the image based on the vertex coordinates and the attributes of the vertices within the image geometry as described above.

Figure 8A:
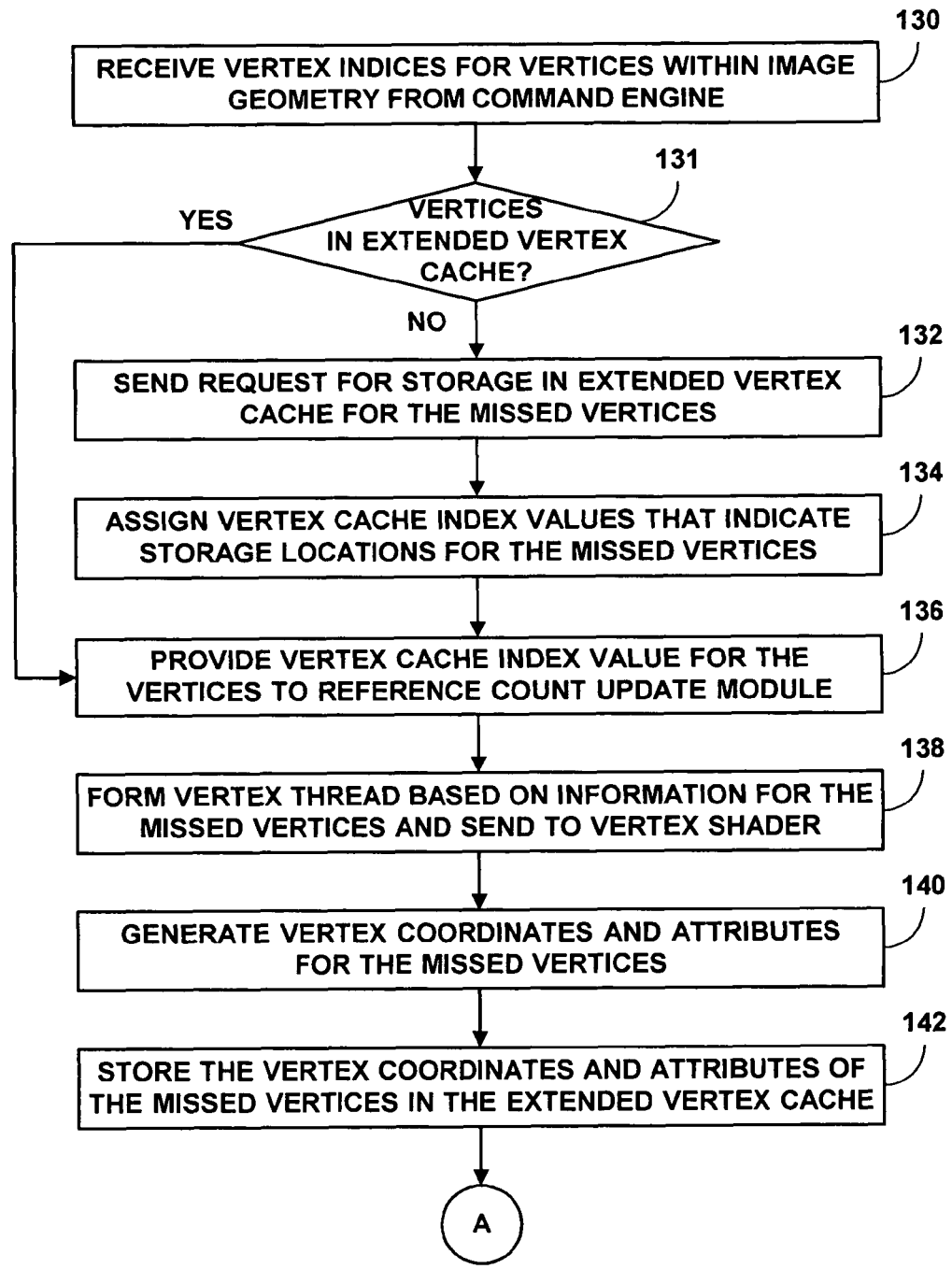
FIGS. 8A and 8B are flowcharts illustrating an exemplary operation of initial processing of vertices within an image geometry.
Figure 8B:
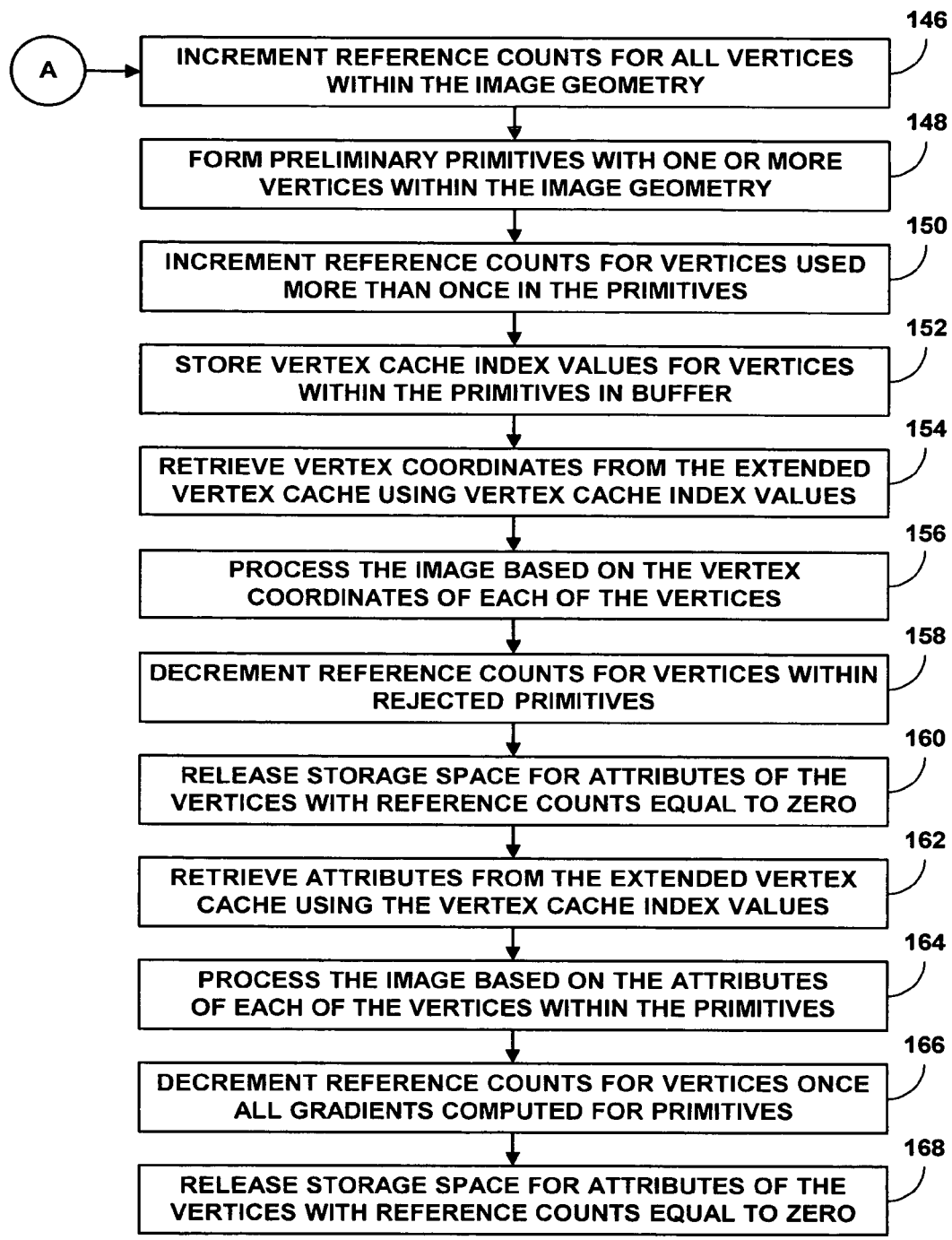

FIGS. 8A and 8B are flowcharts illustrating an exemplary operation of initial processing of vertices within an image geometry. The operation will be described herein in reference to GPU 14A from FIG. 7. Extended vertex cache 16A including a reference count storage 128 and a storage release module 129 may be created within GPU 14A during manufacture of device 10 and coupled to GPU pipeline 18A. Reference count storage 128 stores the reference counts for each of the vertices within the image geometry. Storage release module 129 manages the allocation and release of storage space in extended vertex cache 16A, and updating of reference counts within reference count storage 128.

Command engine 42 receives an image geometry and rendering commands for an image from controller 12 of device 10. Vertex decision module 120 receives vertex indices for vertices within the image geometry from command engine 42 (130). Vertex decision module 120 determines whether each of the vertices within the image geometry are included in extended vertex cache 16A based on the corresponding vertex indices (131). Vertices within the image geometry that are not included in extended vertex cache 16A are referred to herein as "missed vertices". Vertices within the image geometry that are already included in extended vertex cache 16A are referred to herein as "hit vertices"

In the case of hit vertices, vertex decision module 120 provides the vertex cache index values that indicate storage locations in extended vertex cache 16A of the vertex coordinates and attributes for each of the hit vertices to reference count update module 122 within GPU pipeline 18A (136). In the case of missed vertices, vertex decision module 120 sends a request for storage space in extended vertex cache 16A to missed vertex module 126 for each of the missed vertices (132). Missed vertex module 126 assigns vertex cache index values to each of the missed vertices that indicate storage locations of vertex coordinates and attributes for the missed vertices in extended vertex cache 16A (134). Vertex decision module 120 then provides the vertex cache index values that indicate storage locations in extended vertex cache 16A of the vertex coordinates and attributes for the missed vertices to reference count update module 122 within GPU pipeline 18A (136).

Missed vertex module 126 reads information for the missed vertices and performs related format conversions. Missed vertex module 126 forms a vertex thread based on the information for the missed vertices, and sends the vertex thread to vertex shader 44 (138). Vertex shader 44 is applied to each of the missed vertices and generates vertex coordinates and attributes of the missed vertices within the image geometry (140). Vertex shader 44 then stores the vertex coordinates and attributes for the missed vertices at the assigned storage locations in extended vertex cache 16A (142).

Upon receiving the vertex cache index values for the missed vertices, reference count update module 122 initializes reference counts within reference count storage 128 for each of the missed vertices to zero. Reference count update module 122 then increments the reference counts within reference count storage 128 for all the vertices, hit and missed, within the image geometry by one (146).

Primitive assembler 124 forms preliminary primitives with one or more vertices within the image geometry (148). When primitive assembler 124 assembles a preliminary primitive in which each of the vertices are only used once, reference counts within reference count storage 128 for the vertices are not incremented and remain unchanged. When primitive assembler 124 assembles a preliminary primitive in which at least one of the vertices is used more than once, primitive assembler 124 increments a reference count within reference count storage 128 for the at least one vertex by one each time the vertex is reused (150). Primitive assembler 124 places the vertex cache index values for the vertices within the preliminary primitives in a FIFO buffer positioned between primitive assembler 124 and primitive setup and rejection module 46 (152).

Primitive setup and rejection module 46 receives the vertex cache index values for the attributes of each of the vertices in the image geometry from the FIFO buffer. Primitive setup and rejection module 46 then retrieves vertex coordinates for each of the vertices within the image geometry from extended vertex cache 16A using the vertex cache index values (154). Primitive setup and rejection module 46 processes the image based on the retrieved vertex coordinates for each of the vertices within the image geometry (156). Upon rejecting a primitive for the image geometry, primitive setup and rejection module 46 sends a request to storage release module 129 to release storage space in extended vertex cache 16A for the attributes of the vertices within the rejected primitive. Upon receiving the request, storage release module 129 decrements reference counts within reference count storage 128 for the vertices within the rejected primitive by one (158). If the reference counts within reference count storage 128 are decremented to zero, storage release module 129 releases the storage space in extended vertex cache 16A for the attributes of the vertices within the rejected primitive (160).

Primitive setup and rejection module 46 then passes the vertex coordinates and vertex cache index values for each of the vertices in the image geometry along GPU pipeline 18A. The processing stages within GPU pipeline 18A process the image based on the vertex coordinates for the vertices within the image geometry as described above. Attribute gradient setup module 52 retrieves the vertex attributes from extended vertex cache 16A using the vertex cache index values for the vertices within the primitives (162). Attribute gradient setup module 52 processes the image based on the retrieved attributes of each of the vertices within the image geometry (164).

Upon computing gradients of attributes of all vertices within a primitive for the image geometry, attribute gradient setup module 52 sends a request to storage release module 129 to release storage space in extended vertex cache 16A for the attributes of the vertices within the primitive. Upon receiving the request, storage release module 129 decrements reference counts within reference count storage 128 for the vertices within the primitive by one (166). If the reference counts within reference count storage 128 are decremented to zero, storage release module 129 releases the storage space in extended vertex cache 16A for the attributes of the vertices within the primitive (168).

A number of embodiments have been described. However, various modifications to these embodiments are possible, and the principles presented herein may be applied to other embodiments as well. Methods as described herein may be implemented in hardware, software, and/or firmware. The various tasks of such methods may be implemented as sets of instructions executable by one or more arrays of logic elements, such as microprocessors, embedded controllers, or IP cores. In one example, one or more such tasks are arranged for execution within a mobile station modem chip or chipset that is configured to control operations of various devices of a personal communications device such as a cellular telephone.

The techniques described in this disclosure may be implemented within a general purpose microprocessor, digital signal processor (DSP), application specific integrated circuit (ASIC), field programmable gate array (FPGA), or other equivalent logic devices. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like. The instructions cause one or more processors to perform certain aspects of the functionality described in this disclosure.

As further examples, an embodiment may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. The data storage medium may be an array of storage elements such as semiconductor memory (which may include without limitation dynamic or static RAM, ROM, and/or flash RAM) or ferroelectric, ovonic, polymeric, or phase-change memory; or a disk medium such as a magnetic or optical disk.

In this disclosure, various techniques have been described for processing images with a GPU using an extended vertex cache. The techniques include creating an extended vertex cache external to a GPU pipeline to reduce an amount of data passing through the GPU pipeline. According to the techniques described herein, the GPU pipeline receives an image geometry for an image, and stores attributes for vertices within the image geometry in the extended vertex cache. In some embodiments, the GPU pipeline temporarily stores the vertex coordinates in the extended vertex cache. The GPU pipeline only passes vertex coordinates that identify the vertices, and vertex cache index values that indicate storage locations of the attributes for each of the vertices in the extended vertex cache to other processing stages along the GPU pipeline.

In addition, the techniques described herein defer the computationally intensive setup of attribute gradients to just before attribute interpolation in the GPU pipeline. The vertex attributes may be retrieved from the extended vertex cache for attribute gradient setup as one of the last steps in the GPU pipeline before attribute interpolation. Therefore, the vertex attributes are not introduced to the GPU pipeline until after primitive setup and primitive rejection. In this way, the GPU pipeline only moves the primitives for the image geometry, the vertex coordinates that identify each of the vertices within the primitives, and vertex cache index values for each of the vertices within the primitives.

The techniques substantially eliminate bottlenecks in the GPU pipeline for primitives that include large numbers of attributes. In addition, the techniques improve image processing speed within the GPU pipeline by deferring the attribute gradient setup to just before attribute interpolation in the GPU pipeline. More specifically, deferring the attribute gradient setup within the GPU pipeline until after rejection of a subset of the primitives that are unnecessary for the image may substantially reduce computations and power consumption as the attribute gradient setup will only be performed on a subset of the primitives that are necessary for the image. These and other embodiments are within the scope of the following claims.

The invention claimed is:

1. A method comprising:
    receiving an image geometry for an image within a graphics processing unit (GPU) pipeline included in a GPU;
    storing attributes for vertices within the image geometry in an extended vertex cache coupled to the GPU pipeline; and
    processing the image within the GPU pipeline based on vertex coordinates that identify the vertices and vertex cache index values that indicate storage locations within the extended vertex cache, the storage locations storing attributes of the vertices within the image geometry, wherein the vertex cache index values that indicate storage locations in the extended vertex cache are passed to processing stages along the GPU pipeline, the vertex cache index value that is passed along the GPU pipeline to a processing stage of the GPU pipeline for use by the processing stage to retrieve an attribute stored at the location in the extended vertex cache indicated by the vertex cache index value.

2. The method of claim 1, further comprising generating vertex coordinates and attributes of vertices within the image geometry not included in the extended vertex cache by performing vertex shading.

3. The method of claim 1, further comprising:
    determining which of the vertices within the image geometry comprise hit vertices included in the extended vertex cache;
    determining which of the vertices within the image geometry comprise missed vertices not included in the extended vertex cache; and
    generating vertex coordinates and attributes of each of the missed vertices within the image geometry.

4. The method of claim 3, further comprising:
    maintaining stored attributes for each of the hit vertices within the image geometry in the extended vertex cache; and retrieving vertex cache index values that indicate storage locations of the stored attributes in the extended vertex cache for each of the hit vertices.

5. The method of claim 3, further comprising:
assigning vertex cache index values that indicate storage locations of attributes in the extended vertex cache for each of the missed vertices within the image geometry; and
storing generated attributes for each of the missed vertices at the assigned storage locations in the extended vertex cache.

6. The method of claim 1, further comprising:
storing the vertex coordinates for each of the vertices within the image geometry in the extended vertex cache; and
retrieving the vertex coordinates from the extended vertex cache using the vertex cache index values for each of the vertices within the image geometry to process the image.

7. The method of claim 1, further comprising:
incrementing references counts in a reference count storage included in the extended vertex cache for each of the vertices within the image geometry;
creating preliminary primitives with one or more vertices within the image geometry;
incrementing reference counts in the reference count storage for vertices used more than once within the preliminary primitives; and
storing vertex cache index values for the vertices within the preliminary primitives in a buffer to process the image.

8. The method of claim 1, further comprising passing the vertex coordinates and the vertex cache index values for each of the vertices to processing stages along the GPU pipeline.

9. The method of claim 1, wherein processing the image comprises deferring processing the image geometry based on the attributes of the vertices within primitives for the image geometry to just before attribute interpolation in the GPU pipeline.

10. The method of claim 9, wherein deferring processing the image geometry comprises deferring computing gradients of attributes of the vertices within the primitives for the image geometry to just before attribute interpolation in the GPU pipeline.

11. The method of claim 1, wherein processing the image comprises:
creating primitives with one or more vertices within the image geometry;
rejecting a first subset of the primitives that are unnecessary for the image based on the vertex coordinates;
retrieving the vertex attributes of each of the vertices within a second subset of the primitives that are necessary for the image from the extended vertex cache using the vertex cache index values for the vertices; and
computing gradients of attributes associated with the second subset of the primitives for the image geometry based on the attributes retrieved from the extended vertex cache.

12. The method of claim 11, wherein rejecting the first subset of the primitives comprises:
rejecting invisible primitives for the image geometry using backface culling and scissoring based on the vertex coordinates; and
rejecting hidden primitives and hidden pixels within primitives for the image geometry using early depth and stencil test based on the vertex coordinates.

13. The method of claim 11, further comprising requesting release of storage space in the extended vertex cache for attributes associated with the rejected first subset of the primitives for the image geometry.

14. The method of claim 13, further comprising:
decrementing reference counts for vertices within the first subset of the primitives upon receiving the request to release storage space in the extended vertex cache; and
releasing storage space in the extended vertex cache for the attributes of the vertices within the first subset of the primitives when the reference counts for the vertices are decremented to zero.

15. The method of claim 11, further comprising converting the primitives for the image geometry into pixels based on the vertex coordinates prior to computing the gradients of the attributes associated with the second subset of the primitives.

16. The method of claim 11, further comprising requesting release of storage space in the extended vertex cache for the attributes associated with the second subset of the primitives for the image geometry after computing the gradients of all the attributes associated with the second subset of the primitives.

17. The method of claim 16, further comprising:
decrementing reference counts for the vertices within the second subset of primitives upon receiving the request to release storage space in the extended vertex cache; and
releasing storage space in the extended vertex cache for attributes of the vertices within the second subset of the primitives when the reference counts for the vertices are decremented to zero.

18. The method of claim 11, further comprising:
interpolating the attributes over pixels within the second subset of the primitives for the image geometry based on attribute gradient values just after computing the gradients of the attributes associated with the second subset of the primitives; and
performing pixel rendering of the second subset of the primitives for the image geometry based on interpolated attribute values.

19. The method of claim 1, wherein processing the image comprises:
processing the image geometry based on the vertex coordinates;
retrieving the attributes of the vertices from the extended vertex cache using the vertex cache index values for the vertices; and
processing the image geometry based on the attributes of the vertices within primitives for the image geometry.

20. The method of claim 1, wherein the vertex coordinates and attributes of the vertices within the image geometry are generated external to the GPU and the extended vertex cache comprises an extended vertex buffer, the method further comprising:
storing the attributes for each of the vertices in the extended vertex buffer; and
processing the image within the GPU pipeline based on the vertex coordinates and vertex index values that identify storage locations of the attributes within the extended vertex buffer for each of the vertices within the image geometry.

21. A computer-readable medium comprising instructions that cause a programmable processor to:
receive an image geometry for an image within a graphics processing unit (GPU) pipeline included in a GPU;
store attributes for vertices within the image geometry in an extended vertex cache coupled to the GPU pipeline; and process the image within the GPU pipeline based on vertex coordinates that identify the vertices and vertex cache index values that indicate storage locations within the extended vertex cache, the storage locations storing attributes of the vertices within the image geometry, wherein the vertex cache index values that indicate storage locations in the extended vertex cache are passed to processing stages along the GPU pipeline, the vertex cache index value that is passed along the GPU pipeline to a processing stage of the GPU pipeline for use by the processing stage to retrieve an attribute stored at the location in the extended vertex cache indicated by the vertex cache index value.

22. The computer-readable medium of claim 21, further comprising instructions that cause the programmable processor to:
  determine which of the vertices within the image geometry comprise hit vertices included in the extended vertex cache;
  determine which of the vertices within the image geometry comprise missed vertices not included in the extended vertex cache; and
  generate vertex coordinates and attributes of each of the missed vertices within the image geometry.

23. The computer-readable medium of claim 22, wherein the instructions cause the programmable processor to:
  maintain stored attributes for each of the hit vertices within the image geometry in the extended vertex cache and retrieve vertex cache index values that indicate storage locations of the attributes in the extended vertex cache for each of the hit vertices; and
  assign vertex cache index values that indicate storage locations of attributes in the extended vertex cache for each of the missed vertices within the image geometry and store generated attributes for each of the missed vertices at the storage locations in the extended vertex cache.

24. The computer-readable medium of claim 21, further comprising instructions that cause the programmable processor to:
  store the vertex coordinates for each of the vertices within the image geometry in the extended vertex cache; and
  retrieve the vertex coordinates from the extended vertex cache using the vertex cache index values for each of the vertices within the image geometry to process the image.

25. The computer-readable medium of claim 21, wherein the instructions cause the programmable processor to defer processing the image geometry based on the attributes of the vertices within primitives for the image geometry to just before attribute interpolation in the GPU pipeline.

26. The computer-readable medium of claim 25, wherein the instructions cause the programmable processor to defer computing gradients of attributes of the vertices within the primitives for the image geometry to just before attribute interpolation in the GPU pipeline.

27. The computer-readable medium of claim 21, wherein the instructions cause the programmable processor to:
  create primitives with one or more vertices within the image geometry;
  reject a first subset of the primitives that are unnecessary for the image based on the vertex coordinates;
  retrieve the attributes of each of the vertices within a second subset of the primitives that are necessary for the image from the extended vertex cache using the vertex cache index values for the vertices; and
  compute gradients of attributes associated with the second subset of the primitives for the image geometry based on the attributes retrieved from the extended vertex cache.

28. The computer-readable medium of claim 27, further comprising instructions that cause the programmable processor to request release of storage space in the extended vertex cache for attributes associated with the rejected first subset of the primitives for the image geometry.

29. The computer-readable medium of claim 27, further comprising instructions that cause the programmable processor to convert the primitives for the image geometry into pixels based on the vertex coordinates prior to computing the gradients of the attributes associated with the second subset of the primitives.

30. The computer-readable medium of claim 27, further comprising instructions that cause the programmable processor to request release of storage space in the extended vertex cache for attributes associated with the second subset of the primitives for the image geometry after computing the gradients of all the attributes associated with the second subset of the primitives.

31. The computer-readable medium of claim 27, further comprising instructions that cause the programmable processor to:
  interpolate the attributes over pixels within the second subset of the primitives for the image geometry based on attribute gradient values just after computing the gradients of the attributes associated with the second subset of the primitives; and
  perform pixel rendering of the second subset of the primitives for the image geometry based on interpolated attribute values.

32. The computer-readable medium of claim 21, wherein the instructions cause the programmable processor to:
  process the image geometry based on the vertex coordinates;
  retrieve the attributes of the vertices from the extended vertex cache using the vertex cache index values for the vertices; and
  process the image geometry based on the attributes of the vertices within primitives for the image geometry.

33. The computer-readable medium of claim 21, wherein the vertex coordinates and attributes of the vertices within the image geometry are generated external to the GPU and the extended vertex cache comprises an extended vertex buffer, further comprising instructions that cause the programmable processor to:
  store the attributes for each of the vertices in the extended vertex buffer; and
  process the image within the GPU pipeline based on the vertex coordinates and vertex index values that identify storage locations of the attributes within the extended vertex buffer for each of the vertices within the image geometry.

34. A device comprising:
  a GPU pipeline that an image geometry for an image and processes the image for display on a display device; and
  an extended vertex cache coupled to the GPU pipeline that stores attributes for vertices within the image geometry, wherein the GPU pipeline processes the image based on vertex coordinates that identify the vertices and vertex cache index values that indicate storage locations within the extended vertex cache, the storage locations storing attributes of the vertices within the image geometry, wherein the vertex cache index values that indicate storage locations in the extended vertex cache are passed to processing stages along the GPU pipeline, the vertex cache index value that is passed along the GPU pipeline to a processing stage of the GPU pipeline for use by the processing stage to retrieve an attribute stored at the location in the extended vertex cache indicated by the vertex cache index value.

35. The device of claim 34, wherein the GPU pipeline includes a vertex shader that generates vertex coordinates and attributes of vertices within the image geometry not included in the extended vertex cache by performing vertex shading.

36. The device of claim 34, wherein the GPU pipeline includes:
a vertex decision module that determines which of the vertices within the image geometry comprise hit vertices included in the extended vertex cache, and determines which of the vertices within the image geometry comprise missed vertices not included in the extended vertex cache; and
a vertex shader that generates vertex coordinates and attributes of each of the missed vertices within the image geometry.

37. The device of claim 36,
wherein the extended vertex cache maintains stored attributes for each of the hit vertices within the image geometry; and
wherein the vertex decision module retrieves vertex cache index values that indicate storage location of the attributes in the extended vertex cache for each of the hit vertices.

38. The device of claim 36,
wherein the GPU pipeline includes a missed vertex module that assigns vertex cache index values that indicate storage location of attributes in the extended vertex cache for each of the missed vertices within the image geometry;
wherein the vertex decision module receives the assigned vertex cache index values for each of the missed vertices from the missed vertex module; and
wherein the extended vertex cache stores generated attributes for each of the missed vertices at the storage locations in the extended vertex cache.

39. The device of claim 34,
wherein the extended vertex cache stores the vertex coordinates for each of the vertices within the image geometry; and
wherein the GPU pipeline retrieves the vertex coordinates from the extended vertex cache using the vertex cache index values for each of the vertices within the image geometry to process the image.

40. The device of claim 34, wherein the extended vertex cache includes a reference count storage, and wherein the GPU pipeline includes:
a reference count update module that increments reference counts in the reference count storage for the vertices within the image geometry;
a primitive assembler that creates preliminary primitives with one or more vertices within the image geometry, and increments reference counts in the reference count storage for vertices used more than once within the preliminary primitives; and
a buffer that stores vertex cache index values for the vertices within the preliminary primitives to process the image.

41. The device of claim 34, wherein GPU pipeline defers processing the image geometry based on the attributes of the vertices within primitives for the image geometry to just before attribute interpolation in the GPU pipeline.

42. The device of claim 41 wherein the GPU pipeline includes an attribute gradient setup module deferred to just before attribute interpolation in the GPU pipeline that computes gradients of attributes of the vertices within the primitives for the image geometry.

43. The device of claim 34, wherein the GPU pipeline includes:
a primitive setup and rejection module that creates primitives with one or more vertices within the image geometry and rejects a first subset of the primitives that are unnecessary for the image based on the vector coordinates;
a hidden primitive and pixel rejection module that rejects a second subset of the primitives that are unnecessary for the image based on the vector coordinates; and
an attribute gradient setup module that retrieves the attributes of each of the vertices within a third subset of the primitives that are necessary for the image from the extended vertex cache using the vertex cache index values for the vertices, and computes gradients of attributes associated with the third subset of the primitives for the image geometry based on the attributes retrieved from the extended vertex cache.

44. The device of claim 43,
wherein the primitive setup and rejection module rejects invisible primitives for the image geometry using back-face culling and scissoring based on the vertex coordinates; and
wherein the hidden primitive and pixel rejection module rejects hidden primitives and hidden pixels within primitives for the image geometry using early depth and stencil test based on the vertex coordinates.

45. The device of claim 43,
wherein the primitive setup and rejection module requests release of storage space in the extended vertex cache for attributes associated with the first subset of the primitives for the image geometry; and
wherein the hidden primitive and pixel rejection module requests release of storage space in the extended vertex cache for attributes associated with the second subset of the primitives for the image geometry.

46. The device of claim 45, wherein the extended vertex cache includes a storage release module that:
decrements reference counts in a reference count storage for vertices within the first and second subsets of the primitives upon receiving the requests to release storage space in the extended vertex cache; and
releases storage space in the extended vertex cache for the attributes of the vertices within the first and second subsets of the primitives when the reference counts in the reference count storage for the vertices are decremented to zero.

47. The device of claim 43, wherein the GPU pipeline includes a rasterizer that converts the primitives for the image geometry into pixels based on the vertex coordinates before the attribute gradient setup module computes the gradients of the attributes associated with the third subset of the primitives.

48. The device of claim 43, wherein the attribute gradient setup module requests the extended vertex cache to release storage space for the attributes associated with the third subset of the primitives for the image geometry after the attribute gradient setup module computes the gradients of all the attributes associated with the third subset of the primitives.

49. The device of claim 48, wherein the extended vertex cache includes a storage release module that:
decrements reference counts in a reference count storage for the vertices within the second subset of primitives upon receiving the request to release storage space in the extended vertex cache; and
releases storage space in the extended vertex cache for attributes of the vertices within the second subset of the primitives when the reference counts in the reference count storage for the vertices are decremented to zero.

50. The device of claim 43, wherein the GPU pipeline includes:
an attribute interpolator that interpolates the attributes over pixels within the third subset of the primitives for the image geometry based on attribute gradient values just after the attribute gradient setup module computes the gradients for the attributes associated with the third subset of the primitives; and
a fragment shader that performs pixel rendering of the third subset of the primitives for the image geometry based on interpolated attribute values.

51. The device of claim 34, wherein the GPU pipeline processes the image geometry based on the vertex coordinates, retrieves the attributes of the vertices from the extended vertex cache using the vertex cache index values for the vertices, and processes the image geometry based on the attributes of the vertices within primitives for the image geometry.

52. The device of claim 34,
wherein the vertex coordinates and the attributes of the vertices within the image geometry are generated external to the GPU pipeline and the extended vertex cache comprises an extended vertex buffer;
wherein the extended vertex buffer stores the attributes for each of the vertices; and
wherein the GPU pipeline processes the image based on the vertex coordinates and vertex index values that identify storage locations of the attributes within the extended vertex buffer for each of the vertices within the image geometry.

53. A device comprising:
processing means for receiving an image geometry for an image; and
storage means for storing attributes for vertices within the image geometry, wherein the processing means processes the image using a graphics processing pipeline and based on vertex coordinates that identify the vertices and vertex cache index values that indicate storage locations within the storage means for each of the vertices within the image geometry, and wherein the vertex cache index values that indicate storage locations in the extended vertex cache are passed to processing stages along the GPU pipeline, the vertex cache index value that is passed along the GPU pipeline to a processing stage of the GPU pipeline for use by the processing stage to retrieve an attribute stored at the location in the storage means indicated by the vertex cache index value.

54. The device of claim 53, wherein the processing means processes the image geometry based on the vertex coordinates, retrieves the attributes of the vertices from the storage means using the vertex cache index values for the vertices, and processes the image geometry based on the attributes of the vertices within primitives for the image geometry.

* * * * *